Figure 1:
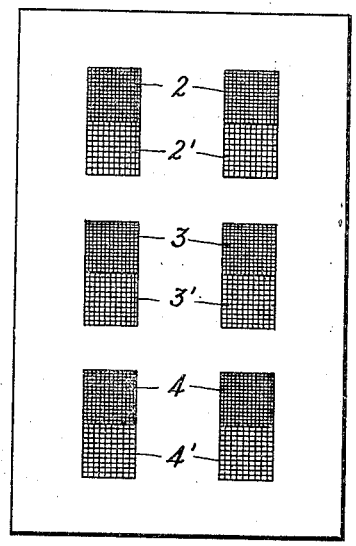

No. 821,521. PATENTED MAY 22, 1906.
W. S. MOODY.
METHOD OF OPERATING A MULTIPHASE TRANSFORMER HAVING THE WINDINGS FOR ONE PHASE INOPERATIVE.
APPLICATION FILED OCT. 22, 1904.

Witnesses:

Inventor:
Walter S. Moody,
by
Att'y.

UNITED STATES PATENT OFFICE.

WALTER S. MOODY, OF SCHENECTADY, NEW YORK, ASSIGNOR TO GENERAL ELECTRIC COMPANY, A CORPORATION OF NEW YORK.

METHOD OF OPERATING A MULTIPHASE TRANSFORMER HAVING THE WINDINGS FOR ONE PHASE INOPERATIVE.

No. 821,521.     Specification of Letters Patent.     Patented May 22, 1906.

Application filed October 22, 1904. Serial No. 229,577.

*To all whom it may concern:*

Be it known that I, WALTER S. MOODY, a citizen of the United States, residing at Schenectady, county of Schenectady, State of New York, have invented certain new and useful Improvements in Methods of Operating a Multiphase Transformer Having the Windings for One Phase Inoperative, of which the following is a specification.

It has frequently been urged against the use of a multiphase transformer with interlinked magnetic circuits that if one or more windings become damaged by short-circuiting, grounding, or through any other defect it is impossible to operate from the undamaged windings of the other phases, as would be the case if a single-phase transformer were used in each phase of the multiple-phase system. I have discovered, however, that this objection is not as important as it seems, but that for many purposes such a transformer of the shell type may be employed exactly as could the remaining undamaged single-phase transformers.

Where the windings of one or more of the phases of a multiple-phase shell-type transformer having interlinked magnetic circuits become inoperative for any reason, I short-circuit the high-potential winding of the damaged phase of the transformer upon itself. Similarly, I short-circuit the corresponding low-potential winding of the transformer upon itself. The windings thus short-circuited will choke down the flux passing through the portion of the core surrounded by them without generating in any portion of the windings a current greater than a small fraction of the full-load current in such portion.

In some cases, as of serious short-circuiting or the like, it may be that one or more open circuits are produced in the damaged windings. In that case I separate the windings and short-circuit enough portions of the windings to prevent the passage of an appreciable flux through them without the generation of large enough currents in said portions to produce dangerous heat effects. After the damaged windings are short-circuited in the manner described the perfect windings for the other phases can be put in service and used exactly as could a similar number of single-phase transformers. It will of course be understood that where, for instance, the winding of one phase of a three-phase transformer is damaged the two remaining phases will safely carry only two-thirds of the normal full load of the transformer. This would also be the case, however, if one of three single-phase transformers used in a three-phase system were damaged.

The various features of novelty which characterize my invention are pointed out with particularity in the claims annexed to and forming a part of this specification. For a better understanding of my invention, however, reference may be had to the accompanying drawings, of which—

Figure 2:
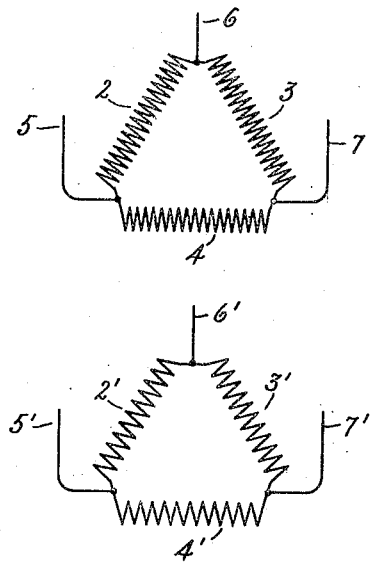
Figure 3:
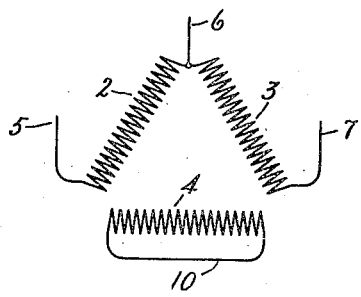
Figure 4:
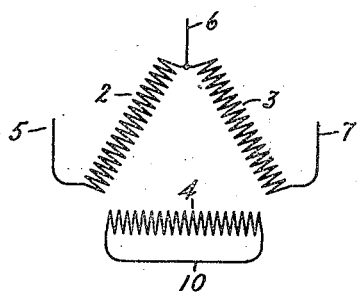
Figure 4:
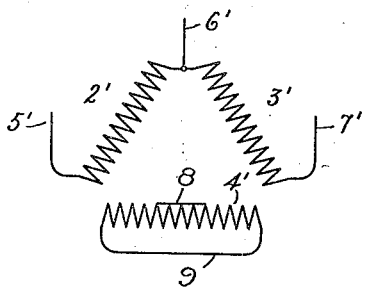
Figure 4:
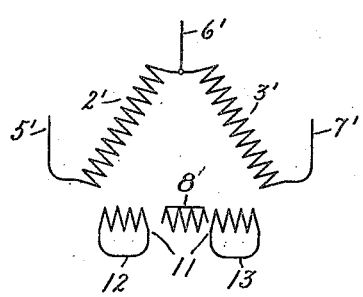

Figure 1 is a plan view with the windings in section of a three-phase shell-type transformer with interlinked magnetic circuits. Fig. 2 is a diagram of the windings of the transformer in its normal condition. Fig. 3 is a diagram showing the connections with one phase inoperative, and Fig. 4 shows an arrangement where the winding for one phase is injured in a manner different from that shown in Fig. 3.

In the drawings, 1 represents the core of the transformer, and 2, 3, and 4 represent the high-potential windings for the different phases of the transformer, while 2', 3', and 4' represent the low-potential windings of the transformer. While in the drawings I have shown the high and low potential windings of each phase in sections passing side by side through apertures formed for the purpose in the core, it will of course be understood that in the actual transformer the high and low potential portions of the windings of each phase are ordinarily subdivided and intermeshed.

In the normal operation of the transformer the high-potential windings 2, 3, and 4 are connected in delta, as shown, to the high-potential main conductors 5, 6, and 7, as shown in Fig. 2. Similarly, the windings 2', 3', and 4' are connected to the low-potential main conductors 5', 6', and 7'.

When the transformer becomes defective—as, for instance, by the short-circuiting of a portion of the turns of the low-potential winding, as indicated at 8 in Fig. 3—I disconnect the winding 4' from the windings 2' and 3' and from the conductors 5' and 6' and then connect the terminals of the winding 4' together by a conductor 9. Similarly, I disconnect the winding 4 from the high-potential system and connect the terminals by a conductor 10.

Where the damage to the winding 4' is such as to open-circuit the winding, as shown, for instance, at points 11 at each side of the accidentally-short-circuited portions 8' in Fig. 4, I connect the terminals of the portions at each side of the damaged portion by short-circuiting conductors 12 and 13. I then short-circuit the other high-potential winding 4 of the phase, as above described.

The short-circuited windings 4 and 4' prevent the passage of any but a very small flux through the portion of the core surrounding them, and the current induced in no portion of the windings 4 and 4' will be larger than a small fraction of the normal full-load current of the windings 4 and 4'. The windings 2 and 2' and 3 and 3' can then be used exactly as could two single-phase transformers in a three-phase system.

What I claim as new, and desire to secure by Letters Patent of the United States, is—

1. The method of operating a three-phase shell-type transformer, which consists in delta-connecting the windings for two of the phases into a three-phase system, and short-circuiting part or all of the windings of the other phases.

2. The method of operating a multiphase shell-type transformer, which consists in connecting the windings for some of the phases in a multiphase system and closing the remaining windings upon themselves.

3. The method of operating a multiphase shell-type transformer having a number of core portions normally surrounded by windings, each of said windings being normally connected into a multiphase system which consists in replacing one or more of said windings with windings short-circuited upon themselves.

4. The method of operating in a multiphase system, a multiphase shell-type transformer having as many core-sections as there are branches in the multiphase system, which consists in connecting windings surrounding some of said core-sections into the multiphase system, and providing means for practically eliminating the passage of magnetic fluxes through the remaining of said core-sections.

5. The method of operating in a multiphase system, a multiphase shell-type transformer having as many circuits of magnetic material as there are branches in a multiphase system, which consists in connecting windings placed about certain of said circuits in a multiphase system, and short-circuiting windings placed about the remaining of said circuits.

6. The method of operating a multiphase transformer having a plurality of core-sections arranged and connected together so that a plurality of closed magnetic circuits are formed which include some of said sections but do not include one of said sections, which consists in practically eliminating the passage of magnetic fluxes through said one of said sections, and connecting windings surrounding others of said sections into a multiphase system.

7. The method of operating a multiphase transformer having a core comprising portions each of which normally forms a part of the paths for multiphase fluxes, which consists in practically eliminating the flux through one of said portions, while allowing multiphase fluxes to pass through others of said portions.

In witness whereof I have hereunto set my hand this 21st day of October, 1904.

WALTER S. MOODY.

Witnesses:
 BENJAMIN B. HULL,
 HELEN ORFORD.